United States Patent Office 3,017,348
Patented Jan. 16, 1962

3,017,348
FIRE EXTINGUISHING COMPOSITIONS
Vollrad Steppe, Illertissen, and Wilhelm Schulenburg, Frankfurt am Main, Germany, assignors to Chemische Fabrik Grünau Aktiengesellschaft, Frankfurt am Main, Germany
No Drawing. Filed Jan. 19, 1959, Ser. No. 787,360
Claims priority, application Germany Jan. 22, 1958
5 Claims. (Cl. 252—2)

The present invention relates to improved powdered solid fire extinguishing compositions.

Fire extinguishing compositions of finely divided solid gas evolving substance for combatting fires of most varied type have been known for some time. The best known of such compositions essentially consists of sodium carbonate.

According to the invention it was found that fires of all classes can be extinguished with excellent success with a powdered solid mixture essentially composed of 50 to 90 parts by weight of ammonium phosphate, 15 to 30 parts by weight of ammonium sulfate and 8 to 20 parts by weight of barium sulfate. Preferably, the ammonium phosphate component is formed of a mixture of diammonium phosphate and monoammonium phosphate of such proportions that a neutral reaction is obtained upon contact with water.

It was furthermore found that the stability during storage and the distributability of such mixture can be improved by the addition of known anticaking agents which improve the free flowing characteristics and reduce hygroscopicity. Such known anticaking agents, for example, are magnesium stearate, finely divided silica, such as produced by the vapor phase decomposition of silicon tetrachloride in a flame together with hydrogen containing gases which is commercially available under the trademark "Aerosil," and tricalcium phosphate.

It was found, that particularly stable caking resistant fire extinguishing compositions according to the invention can be obtained by siliconizing the powdered mixture, e.g. by a treatment with one or more of the known silicones. In such a case after the treatment with the silicone the powder has to be cured by heat. It is also possible to treat the powder with a vaporized chlorosilane, such as methyl trichlorosilane, dimethyl dichlorosilane, trimethyl chlorosilane or another similar product.

In some instances it has been found of advantage to add a small quantity, for example, about 1 to 5%, of a synthetic resin to the fire extinguishing composition according to the invention. Examples of such resins, for example, are solid condensation products of aldehydes, such as formaldehyde and acrolein, with amino compounds, such as urea, thiourea guanidine, dicyandiamide and melamine.

The extinguishing action of the compositions according to the invention can also be improved by the addition of small quantities, for example, about 1 to 5%, of a bromine compound, preferable ammonium bromide.

In addition, the extinguishing action can be improved by incorporating small amounts, about 1 to 5%, of a solid amine or acid amide, such as, for example, urea and its derivatives, melamine, dicyandiamide, dicyandiamidine, hexamethylene tetraamine or other condensation products of ammonia and formaldehyde.

Furthermore, it was found that the extinguishing action of the compositions also can be improved by adding a small amount, about 1 to 5%, of a solid aliphatic aldehyde or a solid compound which upon decomposition yields an aliphatic aldehyde. Examples of such compounds, for example, are paraformaldehyde or hexamethylenetetraamine.

The compositions according to the invention may also contain coloring agents.

The compositions according to the invention can be used for extinguishing fires of all classes. They can be applied to the fires by hand or with any suitable apparatus. It is preferable to employ the usual dry chemical fire extinguishing apparatus.

The following examples will serve to illustrate several embodiments of powdered solid fire extinguishing compositions according to the invention.

Example 1

30 parts by weight of diammoniumphosphate
36 parts by weight of monoammoniumphosphate
22 parts by weight of ammonium sulfate
12 parts by weight of barium sulfate
1 part by weight of magnesium stearate
2 parts by weight of tricalcium phosphate
1 part by weight of urea formaldehyde resin (3 parts of formaldehyde:4 parts of urea)
1 part by weight of finely divided silica
2 parts by weight of ammonium bromide
1 part by weight of milori blue

Example 2

51 parts by weight of monoammonium phosphate
15 parts by weight of diammonium phosphate
8 parts by weight of barium sulfate
26 parts by weight of ammonium sulfate
1 part by weight of finely divided silica
1 part by weight of tricalcium phosphate
1 part by weight of magnesium stearate
4 parts by weight of formaldehyde-dicyandiamide resin (1 part of formaldehyde:3 parts of dicyandiamide)

Example 3

1000 kg. of dry fire extinguishing composition prepared according to Example 1 were placed in a closed vessel and maintained in constant movement with the aid of a stirrer. 5 kg. of vaporized methyl trichlorosilane were introduced into the vessel with a stream of carbon dioxide. After 10 minutes at room temperature the siliconization of the composition had been completed. The powder this treated had excellent free flowing properties and was water repellent.

Example 4

56 parts by weight of monoammonium phosphate
10 parts by weight of diammonium phosphate
24 parts by weight of ammonium sulfate
10 parts by weight of barium sulfate
1.5 parts by weight of finely divided silica
1.5 parts by weight of tricalcium phosphate
1 part by weight of magnesium stearate
1 part by weight of melamine

Example 5

50 parts by weight of monoammonium phosphate
16 parts by weight of diammonium phosphate
22 parts by weight of ammonium sulfate
12 parts by weight of barium sulfate
1 part by weight of finely divided silica
2 parts by weight of tricalcium phosphate
1 part by weight of magnesium stearate
1 part by weight of hexamethylenetetraamine

Example 6

50 parts by weight of monoammonium phosphate
16 parts by weight of diammonium phosphate
22 parts by weight of ammonium sulfate
12 parts by weight of barium sulfate
1 part by weight of finely divided silica 2 parts by weight of tricalcium phosphate
1 part by weight of magnesium stearate
1 part by weight of paraformaldehyde

We claim:
1. A solid dry chemical fire extinguishing composition consisting essentially of a powdered mixture of 50 to 90 parts by weight of ammonium phosphate, 15 to 30 parts by weight of ammonium sulfate and 8 to 20 parts by weight of barium sulfate.
2. A solid dry chemical fire extinguishing composition according to claim 1 in which the ammonium phosphate component is a mixture of monoammonium phosphate and diammonium phosphate.
3. A solid dry chemical fire extinguishing composition according to claim 1 which also contains a relatively small quantity of a urea-formaldehyde resin.
4. A solid dry chemical fire extinguishing composition according to claim 1 which also contains a relatively small quantity of material improving the free flowing characteristics and reducing the hygroscopicity of the composition selected from the group consisting of finely divided silica, magnesium stearate, tricalcium phosphate and silicones.
5. A solid dry chemical fire extinguishing composition according to claim 1 in which the individual grains of said powdered mixture are coated with a water repellent silicone.

References Cited in the file of this patent

UNITED STATES PATENTS

| | | |
|---|---|---|
| 502,867 | Schuler | Aug. 8, 1893 |
| 1,793,420 | Block | Feb. 17, 1931 |
| 2,631,977 | Allen | Mar. 17, 1953 |
| 2,648,641 | Robison | Aug. 11, 1953 |
| 2,816,864 | Warnock | Dec. 17, 1957 |
| 2,866,760 | Haessler et al. | Dec. 30, 1958 |
| 2,881,138 | Reiss | Apr. 7, 1959 |
| 2,901,427 | Steppe | Aug. 25, 1959 |
| 2,901,428 | Schulenburg | Aug. 25, 1959 |